(12) United States Patent  (10) Patent No.: US 9,100,142 B2
Weibel et al.  (45) Date of Patent: Aug. 4, 2015

(54) SYNCHRONOUS DATA TRANSMISSION SYSTEM

(71) Applicant: Endress + Hauser GmbH + Co. KG, Maulburg (DE)

(72) Inventors: Mathieu Weibel, Saint Louis (FR); Martin Link, Merdingen (DE); Christian Muller, Lorrach (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 0 days.

(21) Appl. No.: 14/366,102

(22) PCT Filed: Nov. 22, 2012

(86) PCT No.: PCT/EP2012/073349
§ 371 (c)(1),
(2) Date: Jun. 17, 2014

(87) PCT Pub. No.: WO2013/092101
PCT Pub. Date: Jun. 27, 2013

(65) Prior Publication Data
US 2014/0328443 A1 Nov. 6, 2014

(30) Foreign Application Priority Data
Dec. 21, 2011 (DE) .......... 10 2011 089 428

(51) Int. Cl.
H04L 7/00 (2006.01)
H04L 29/08 (2006.01)
H04L 29/06 (2006.01)
G08B 21/18 (2006.01)

(52) U.S. Cl.
CPC .............. *H04L 7/0008* (2013.01); *G08B 21/18* (2013.01); *H04L 67/125* (2013.01); *H04L 69/28* (2013.01)

(58) Field of Classification Search
CPC .......... H04L 7/00; H04L 67/125; H04L 69/28
See application file for complete search history.

(56) References Cited

U.S. PATENT DOCUMENTS

| 5,748,569 A | 5/1998 | Teodorescu |
| 6,011,367 A | 1/2000 | Oedl |
| 6,144,748 A | 11/2000 | Kerns |

(Continued)

FOREIGN PATENT DOCUMENTS

| DE | 112006002559 B4 | 8/2008 |
| EP | 1553731 A2 | 7/2005 |

(Continued)

OTHER PUBLICATIONS

German Search Report, German PTO, Munich, Aug. 13, 2012.

(Continued)

Primary Examiner — Jaison Joseph
(74) Attorney, Agent, or Firm — Bacon & Thomas, PLLC

(57) ABSTRACT

A synchronous data transmission system for transmission of data between two communication partners, of which one serves as a transmitter and one as a receiver, comprising a clock signal producer which produces a transmission clock signal with a transmission clock signal rate from the transmitter to the receiver, which during the occurrence of one of the events equals an event specific transmission clock signal rate associated with the arising event and during an event free period of time equals a fundamental clock rate different of all event specific transmission clock signal rates.

4 Claims, 2 Drawing Sheets

(56) References Cited

U.S. PATENT DOCUMENTS

| | | |
|---|---|---|
| 7,228,372 B2 * | 6/2007 | Yoshimura et al. ........... 710/110 |
| 7,555,670 B2 | 6/2009 | Mohanavelu |
| 2006/0026314 A1 | 2/2006 | Franchuk |
| 2008/0002717 A1 | 1/2008 | Subrahmanyan |
| 2011/0255560 A1 | 10/2011 | Tailliet |

FOREIGN PATENT DOCUMENTS

| | | |
|---|---|---|
| JP | 61277238 | 12/1986 |
| JP | 639182 | 2/1994 |

OTHER PUBLICATIONS

International Search Report, EPO, The Netherlands, Feb. 14, 2013.
English translation of IPR, WIPO, Geneva, Jul. 3, 2014.

* cited by examiner

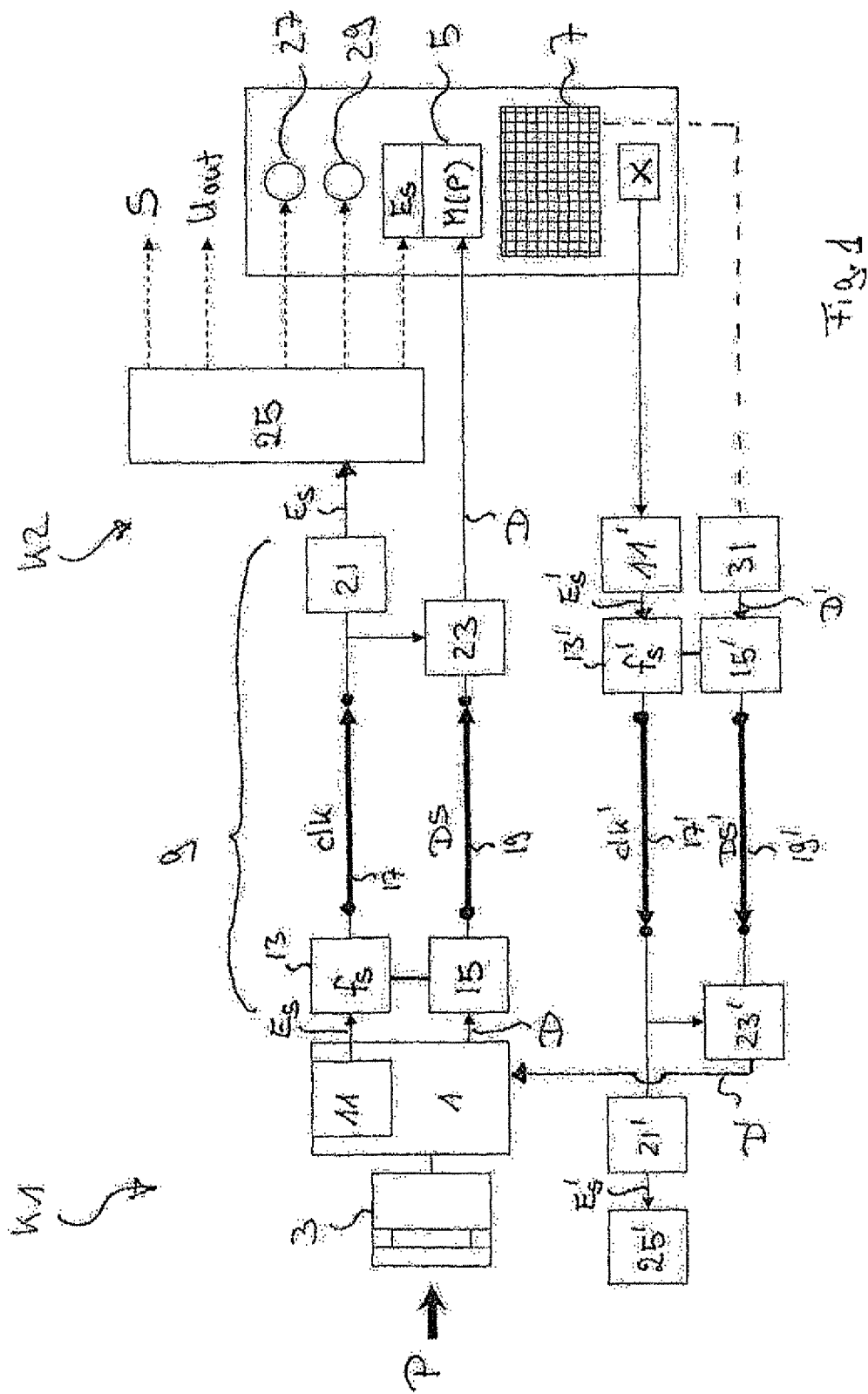

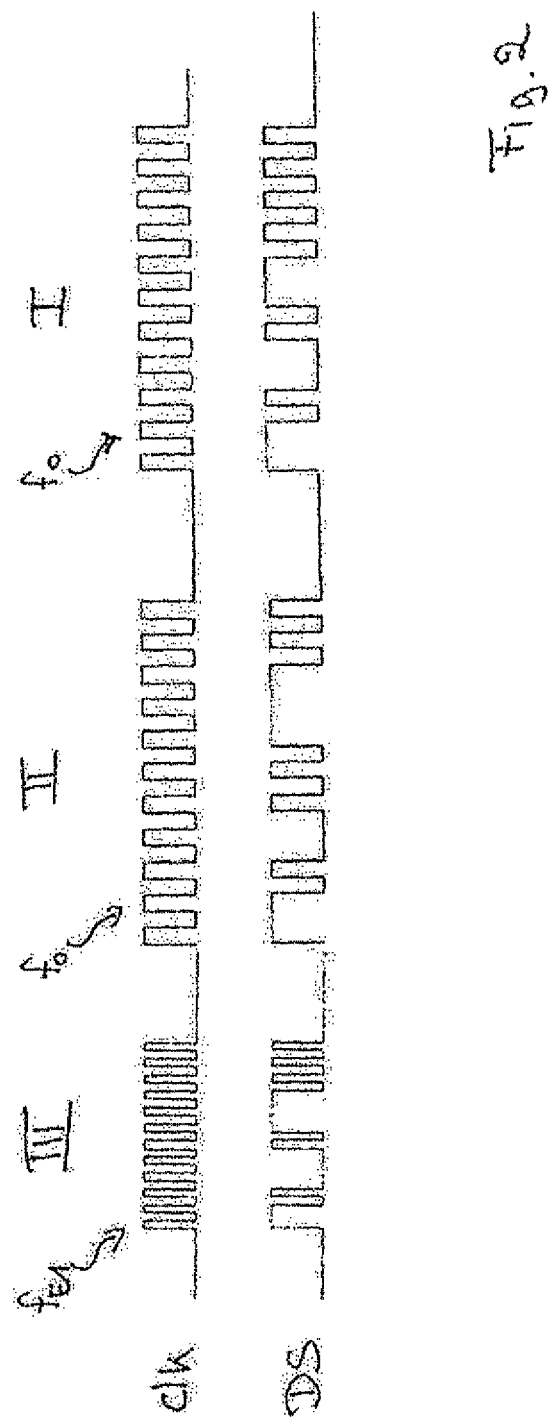

SYNCHRONOUS DATA TRANSMISSION SYSTEM

TECHNICAL FIELD

The invention relates to a synchronous data transmission system for transmission of data between two communication partners, of which one serves as a transmitter and one as a receiver, comprising a clock signal producer, which produces a transmission clock signal having a predetermined transmission clock rate, and a transmission system, which transmits the data carrying, data signals with the predetermined transmission clock rate from the transmitter to the receiver, and which transmits the transmission clock signal from the transmitter to the receiver.

BACKGROUND DISCUSSION

Synchronous data transmission systems are used in a large number of different fields. An example of this is provided by measuring devices, which have at least two measuring device components connected with one another via a synchronous data transmission system. Examples of this include a user interface of the measuring device connected with a measuring electronics or a sensor connected with a superordinated measuring electronics.

In synchronous data transmission, transmitter and receiver are synchronized based on the transmission clock signal transmitted from the transmitter to the receiver in parallel with the data signal. This enables a time correct registering of the data signal at the receiver.

Especially in connection with the above described measuring devices, events occurring suddenly at the transmitter, such as e.g. a sinking of a supply power there, can require rapid maneuvering at the receiver. Thus, for example, in the case of a sudden collapse of the supply power, a rapid turning off or shutting down of not absolutely needed measuring device components can prevent loss or corruption of data.

Accordingly, it is necessary to transmit information concerning such a critical event at the transmitter as rapidly as possible to the receiver, in order that the receiver can execute or initiate appropriate actions as rapidly as possible.

In such case, there arises the problem that data to be sent from the transmitter are serially processed and transmitted. Accordingly, valuable time passes, until a data signal reflecting the critical event can be generated, queued into the data already provided for transmission, and dispatched.

Moreover, during the transmission of the information concerning the critical event, no other data can be transmitted. This can in the case of a collapse of the energy supply of a measuring device have the result that the last ascertained measured values, which might even provide information concerning the cause of the critical event, are irretrievably lost.

SUMMARY OF THE INVENTION

It is an object of the invention to provide a synchronous data transmission system, which is able to transmit information concerning an event occurring at the transmitter as rapidly as possible to the receiver.

For this, the invention resides in a data transmission system for synchronous transmission of data between two communication partners, of which one serves as a transmitter and one as a receiver, comprising an event monitor, which monitors for occurrence at the transmitter of at least one predetermined event, and, in the case of occurrence of one of these events, displays the occurring event during its occurrence as an event occurring at the transmitter, a clock signal producer connected to the event monitor and having an adjustable clock frequency, which produces a transmission clock signal with a transmission clock signal rate, which during the occurrence of one of the events equals an event specific transmission clock signal rate associated with the arising event and during an event free period of time equals a fundamental clock rate different from all event specific transmission clock signal rates, a transmission system, which transmits data signals corresponding to the data to be transmitted with the transmission clock signal rate from the transmitter to the receiver, and which transmits the transmission clock signal from the transmitter to the receiver, and at the receiver and connected to the transmission system, an event recognition system, which, based on the transmission clock signal rate of the transmission clock signal, detects occurrence of one of the events at the transmitter, and, in the case of its occurrence, determines and outputs the event.

In a further development of the invention, there is connected to the event recognition system an apparatus for performing at least one action associated with one of the monitored events, which apparatus effects especially an automatic performance of the action, as soon as the event recognition system outputs the occurrence of the associated event.

In an additional further development of the invention, a number of the monitored events can occur simultaneously at the transmitter, an event hierarchy is predetermined, in which the individual possible events are classified corresponding to their relevance, and the event monitor, in the case of simultaneous occurrence of a plurality of events, shows that event as arisen event, which according to the event hierarchy should be attributed the highest relevance.

In an additional further development, the event monitor, the clock signal producer and the event recognition system are provided in each of the two communication partners, and it is monitored in each of the two communication partners for occurrence there of at least one event predetermined for the respective communication partner, and in the case of its occurrence it is recognized by the respective event monitor and transmitted via the transmission system to the respective other communication partner.

The invention has the advantage that the information concerning an event occurring at the transmitter is transmitted immediately to the receiver via the transmission clock signal rate set as a function of the arisen event. It is especially not necessary to wait until data already earlier provided for transmission are transmitted.

Moreover, it has the advantage that the regular data transmission continues undelayed in parallel during the transmission of the event information. An interruption of the regular data transmission is, thus, not required.

BRIEF DESCRIPTION OF THE DRAWINGS

The invention and other advantages will now be explained in greater detail based on the figures of the drawing, in which an example of an embodiment is presented. The figures of the drawing show as follows:

FIG. 1 is a bidirectional, synchronous, data transmission system; and

FIG. 2 is an example of transmission clock signals and data signals transmitted via the synchronous data transmission system of FIG. 1.

DETAILED DISCUSSION IN CONJUNCTION WITH THE DRAWINGS

FIG. 1 shows a block diagram of a synchronous data transmission system of the invention for transmission of data D between two communication partners K1, K2, of which one serves as transmitter and one as receiver.

The data transmission system of the invention can be embodied as a unidirectional data transmission system, in the case of which one of the communication partner K1, K2 serves permanently as transmitter, while the other serves permanently as receiver. Alternatively, it can be embodied, such as presented in the example of an embodiment illustrated here, as a bidirectional data transmission system.

The two communication partners K1, K2 in the illustrated example of an embodiment are two components of a measuring device. The first communication partner K1 comprises a measuring electronics 1, to which is connected a measuring system 3 for registering a measured variable, here a pressure P acting on the measuring system 3. The second communication partner K2 in the illustrated example of an embodiment is a user interface of the measuring device having a display field for display of the measured values M(P) of the measured pressure P and a control panel 7, via which a user of the measuring device can, for example, for the start-up of the measuring device specify information required by it or a desired measuring range.

The two communication partners K1, K2 are connected with one another via a transmission system 9, via which data D are transmitted from the respective transmitter to the respective receiver.

The following description of the invention occurs now, first of all, based on a transmission example, in the case of which the first communication partner K1 serves as transmitter and the second communication partner K2 as receiver.

In such case, earlier at the transmitter possibly occurring, metrologically registerable, different events E are predetermined, whose occurrence should be monitored in the first communication partner K1.

Thus in the present example, for example, a disturbance of the measuring system 3 can be predetermined as an event E1, and a sinking of an input power required for the energy supply of the first communication partner K1, especially the measuring electronics 1, below a predetermined threshold value can be predetermined as a further event E2.

According to the invention, there is provided at the transmitter an event monitor 11, which monitors whether one of the predetermined events E occurs. If one of the predetermined events E occurs, then this is recognized by the event monitor 11 and displayed as an event $E_s$ that occurred at the transmitter.

For this, the predetermined events E should be really different, in order that at each time at most one of the registrable events E can be present. If that is not possible, an event hierarchy can be predetermined, in which the events E are classified according to their relevance. Should now two or more events E occur simultaneously, the event monitor 11 detects this, and shows that event E as arisen event $E_s$, which according to the event hierarchy should be assigned the highest relevance.

The event monitor 11 can be embodied as part of the measuring electronics 1, which, for this purpose, is equipped with correspondingly formed monitoring systems.

A disturbance the measuring system 3 can occur, for example, by a short-circuit monitoring or based on a monitoring of a desired value range predetermined for measuring signals of the measuring system 3.

A sinking the energy supply below the predetermined threshold value can occur, for example, via a comparator circuit fed with an input voltage determinative for the energy supply.

According to the invention, a clock signal producer 13 is provided, with has an adjustable clock frequency. During data transmission operation, it produces a transmission clock signal clk with a transmission clock signal rate $f_s$ predetermined as a function of the events E indicated by the event monitor 11. In such case, there is associated with each individual possible monitored event E, here the events E1 and E2, in each case, another event specific transmission clock signal rate $f_{E1}$, $f_{E2}$. If the event monitor 11 registers no event E, then the clock signal producer 13 issues a transmission clock signal clk having a predetermined fundamental clock rate $f_0$ different from the event specific transmission clock signal rates $f_{E1}$, $f_{E2}$.

The clock signal producer 13 is connected for this in the first communication system K1 directly to the event monitor 11, which, via a corresponding control line, effects the event dependent adjusting of the transmission clock signal rate $f_s$ of the transmission clock signal clk to be generated by the clock signal producer 13.

In regular data transmission operation, data D to be transferred from the transmitter to the receiver comprise, for example, measured values M(P) derived by the measuring electronics 1 based on the measuring signals of the measuring system 3.

They are fed to a data output system 15 connected with the clock signal producer 13. Data output system 15 outputs data signals DS reflecting the data D with the transmission clock signal rate $f_s$ predetermined as a function of the events E indicated by the event monitor 11.

The transmission system 9 connecting the two communication partners K1, K2 with one another includes, connected to the clock signal producer 13 provided on the transmitter side, a first clocking line 17, via which the event dependent transmission clock signal clk is transmitted from the transmitter to the receiver. In parallel thereto, the transmission system 9 also includes, connected to the data output system 15 on the transmitter side, a first data line 19, via which the data signals DS are transmitted from the transmitter to the receiver.

FIG. 2 shows, in this regard, an example of the signals. Shown in the top half of FIG. 2 is an example of a waveform of a transmission clock signal clk transmitted via the first clocking line 17 and therebeneath an example of a waveform of a data signal DS transmitted parallel thereto via the first data line 19. This example of the signals includes three transmission periods I, II, III following one after the other. In each case, a data set was transmitted. During the first two transmission periods I, II, no event E was detected by the event monitor 11. Accordingly, transmission was with the transmission clock signal rate $f_s=f_0$ corresponding to the fundamental clock rate. Before the beginning of the third transmission period, the event E1 was recognized and displayed by the event monitor 11. Accordingly, the transmission during the third transmission period III occurs with the here higher, event specific, transmission clock signal rate $f_{E1}$ associated with the arisen event E1.

Provided on the receiver side is a state recognition system 21, which, based on the transmission clock signal rate $f_s$ set as a function of the events E indicated by the event monitor 11, determines whether one of the events E has occurred at the transmitter. If that is the case, it determines, based on the event-specific transmission clock signal rate $f_s$ in such case, the arisen event $E_s$ and outputs it. The state recognition system 21 is connected for this purpose on the receiver side to the first clocking line 17.

Moreover, provided connected at the receiver both to the first clocking line 17 as well as also to the first data line 19 is a data receiving system 23, which, by means of a sampling of the entering data signals DS synchronized with the transmitter via the transmission clock signal clk, derives the received data D and supplies such to their intended use. Thus, for example, transmitted measured values M(P) can be displayed in the display field 5 of the user interface connected for such purpose to the data receiving system 23.

Therewith, it is for the first time possible immediately to forward to the receiver information concerning an event $E_s$ occurring suddenly at the transmitter, without a delay caused by the form of data transmission. At the same time, the regular data transmission occurring via the same transmission system 9 is neither interrupted nor delayed.

Preferably connected to the event recognition system 21 in the receiver is an apparatus 25 for performing at least one action associated with one of the possible events E1, E2. This effects a preferably automatic performance of the respective action, as soon as the event recognition system 21 outputs the occurrence of the respective associated event E1, E2.

If there occurs at the transmitter the event E1, collapse of energy supply, then the associated action can be, for example, to initiate via corresponding control commands S to be output by the apparatus 25 an emergency operation mode, in which, for example, other components (not shown) of the measuring device not absolutely required for emergency operation are shut down or switched off.

Supplementally or alternatively, in this regard, other actions can be associated with the individual events E. Thus, the occurrence of a certain event E can be displayed to the user, for example, by turning-on a light-emitting diode 27, preferably a light-emitting diode 27 identifying the event E by color-coding or through its spatial arrangement on the user interface. Alternatively or supplementally, a display $E_s'$ of the event $E_s$ arisen at the transmitter can be effected in the display field 5, by the outputting of an acoustic signal or alarm, or by the outputting of an electrical output signal Uout corresponding to the arisen event $E_s$.

If none of the monitored events E occur at the transmitter, then, as a rule, no action is required. Fundamentally, however, also here an action can be provided, such as, for example, a turning-on of a, for example, green light-emitting diode 29 indicating event free operation to the user.

The simultaneous transmission of the invention of data signal DS and event information can naturally be provided in identical manner supplementally also in the reverse direction. In that case, in both communication partners K1, K2, predetermined events E, E' occurring, in given cases, there are monitored and their occurrence transmitted simultaneously with regular data transmission to the respectively other communication partner K2, K1.

For this, provide also in the second communication partner K2 are an event monitor 11', a clock signal producer 13' for producing a transmission clock signal clk' with a transmission clock signal rate $f_s'$ predetermined as a function of the events E' indicated by the event monitor 11', and a data output system 15' connected to a data source 31. The data D' to be sent comprise here, for example, information input via the control panel 7. An example of a possible event E1' to be monitored is here an emergency turning off of the measuring device required via an input in the control panel 7. This is indicated symbolically in FIG. 1 by the key in the control panel 7 bearing the letter X.

Provided in the transmission system 9 is a second clocking line 17', via which the transmission clock signal clk' generated in the second communication partner K2 and having the transmission clock signal rate $f_s'$ predetermined as a function of the events $E_s'$ of the second communication partner K2 indicated by the event monitor 11', is transmitted to the first communication partner K1.

Moreover, a second data line 19' is provided for transmission of the data signals DS' output by the data output system 15' with the transmission clock signal rate $f_s'$ to the first communication partner K1.

Also in the first communication partner K1 the incoming transmission clock signal clk' and the entering data signals DS' are fed to a data receiving system 23', which derives the received data D' therefrom, and, for example, supplies such to the measuring electronics 1 for evaluation or conversion.

Provided in the first communication partner K1 connected to the second clocking line 17' is likewise an event recognition system 21', which, based on the transmission clock signal rate $f_s'$ of the transmission clock signal clk', detects the event $E_s'$ arisen, in given cases, in the second communication partner K2 and outputs such. Moreover, also here, an apparatus 25' can be connected to the event recognition system 21' for automatically executing an action associated with the, in each case, arisen event E'.

While also here in the case of event free operation no action is required, in the case of the presence of the event E1' present by the required emergency shutdown, all components of the first communication partner K1 are switched off.

To the extent that a monitoring in the second communication partner K2 of possibly arising events E' and their rapid transmission to the first communication partner K1 is not required, then naturally the additional components required for this can be omitted and the synchronous data transmission from the second to the first communication partner K2, K1 executed in conventional manner.

The invention claimed is:
1. A data transmission system for synchronous transmission of data between two communication partners, of which one serves as a transmitter and one as a receiver, comprising:
an event monitor, which monitors for occurrence at said transmitter of at least one predetermined event, and, in the case of occurrence of one of these events, displays the occurring event during its occurrence as an event occurring at said transmitter;
a clock signal producer connected to said event monitor and having an adjustable clock frequency, which produces a transmission clock signal with a transmission clock signal rate, which during the occurrence of one of the events equals an event specific transmission clock signal rate associated with the arising event and during an event free period of time equals a fundamental clock rate different from all event specific transmission clock signal rates;
a transmission system, which transmits data signals corresponding to the data to be transmitted with said transmission clock signal rate from said transmitter to said receiver, and which transmits said transmission clock signal from the transmitter to the receiver; and
at said receiver and connected to said transmission system, an event recognition system, which, based on said transmission clock signal rate of the transmission clock sig- nal, detects occurrence of one of the events at the transmitter, and, in the case of its occurrence, determines and outputs the event.

2. The data transmission system as claimed in claim 1, further comprising:

connected to the event recognition system, an apparatus for performing at least one action associated with one of the monitored events, which apparatus effects especially an automatic performance of the action, as soon as the event recognition system outputs the occurrence of the associated event.

3. The data transmission system as claimed in claim 1, wherein:

a number of the monitored events can occur simultaneously at the transmitter;

a event hierarchy is predetermined, in which the individual possible events are classified corresponding to their relevance; and the event monitor, in the case of simultaneous occurrence of a plurality of events, shows that event as arisen event, which according to the event hierarchy should be attributed the highest relevance.

4. The data transmission system as claimed in claim 1, wherein:

said event monitor, said clock signal producer and said event recognition system are provided in each of said two communication partners, and it is monitored in each of said two communication partners for occurrence there of at least one event predetermined for the respective communication partner, and in the case of its occurrence it is recognized by the respective event monitor and transmitted via said transmission system to the respective other communication partner.

* * * * *